(12) United States Patent
Antonijevic et al.

(10) Patent No.: US 7,337,834 B2
(45) Date of Patent: Mar. 4, 2008

(54) MULTI-CHANNEL HEAT EXCHANGER AND CONNECTION UNIT

(75) Inventors: Dragi Antonijevic, Köln (DE); Jörn Fröhling, Köln (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 434 days.

(21) Appl. No.: 10/769,078

(22) Filed: Jan. 30, 2004

(65) Prior Publication Data
US 2005/0016721 A1    Jan. 27, 2005

(30) Foreign Application Priority Data
Jan. 30, 2003    (DE) ................. 103 03 595

(51) Int. Cl.
*F28D 7/10*    (2006.01)
*F28F 9/04*    (2006.01)

(52) U.S. Cl. ............... 165/154; 165/155; 165/178; 285/123.15

(58) Field of Classification Search ............ 165/154, 165/155, 178; 285/123.15
See application file for complete search history.

(56) References Cited

U.S. PATENT DOCUMENTS

| | | | |
|---|---|---|---|
| 2,000,906 A * | 5/1935 | Turner | 122/479.1 |
| 4,368,777 A | 1/1983 | Grasso | |
| 4,448,243 A * | 5/1984 | Pain | 165/134.1 |
| 4,564,065 A * | 1/1986 | Roberts | 165/158 |
| 4,986,349 A * | 1/1991 | Ono | 165/154 |
| 5,435,377 A | 7/1995 | Kratochvil | |
| 5,542,467 A | 8/1996 | Carpentier | |
| 6,098,704 A | 8/2000 | Tsuchiya et al. | |
| 6,374,598 B1 | 4/2002 | Neuschwander | |
| 2002/0046830 A1 | 4/2002 | Ulrich et al. | |

FOREIGN PATENT DOCUMENTS

| | | |
|---|---|---|
| DE | 3024819 | 1/1982 |
| DE | 196 01 579 A1 | 8/1996 |
| GB | 793893 | 4/1958 |
| WO | WO 01/22012 A1 | 3/2001 |
| WO | WO 01/35036 A1 | 5/2001 |

* cited by examiner

*Primary Examiner*—Leonard R Leo
(74) *Attorney, Agent, or Firm*—Brinks Hofer Gilson & Lione

(57) ABSTRACT

The invention relates to a connection unit having a multi-channel heat exchanger with high-pressure channels and low-pressure channels and a connection element with a high-pressure reservoir and a low-pressure reservoir, both with a connection for connection. The axial end of the multi-channel heat exchanger is limited by a termination element that has axial passage holes for the high-pressure flow to the high-pressure reservoir. At the axial end of the multi-channel heat exchanger, in the region of the low-pressure reservoir, longitudinal slots are formed through which the low-pressure flow flows from the low-pressure channel to the low-pressure reservoir.

8 Claims, 5 Drawing Sheets

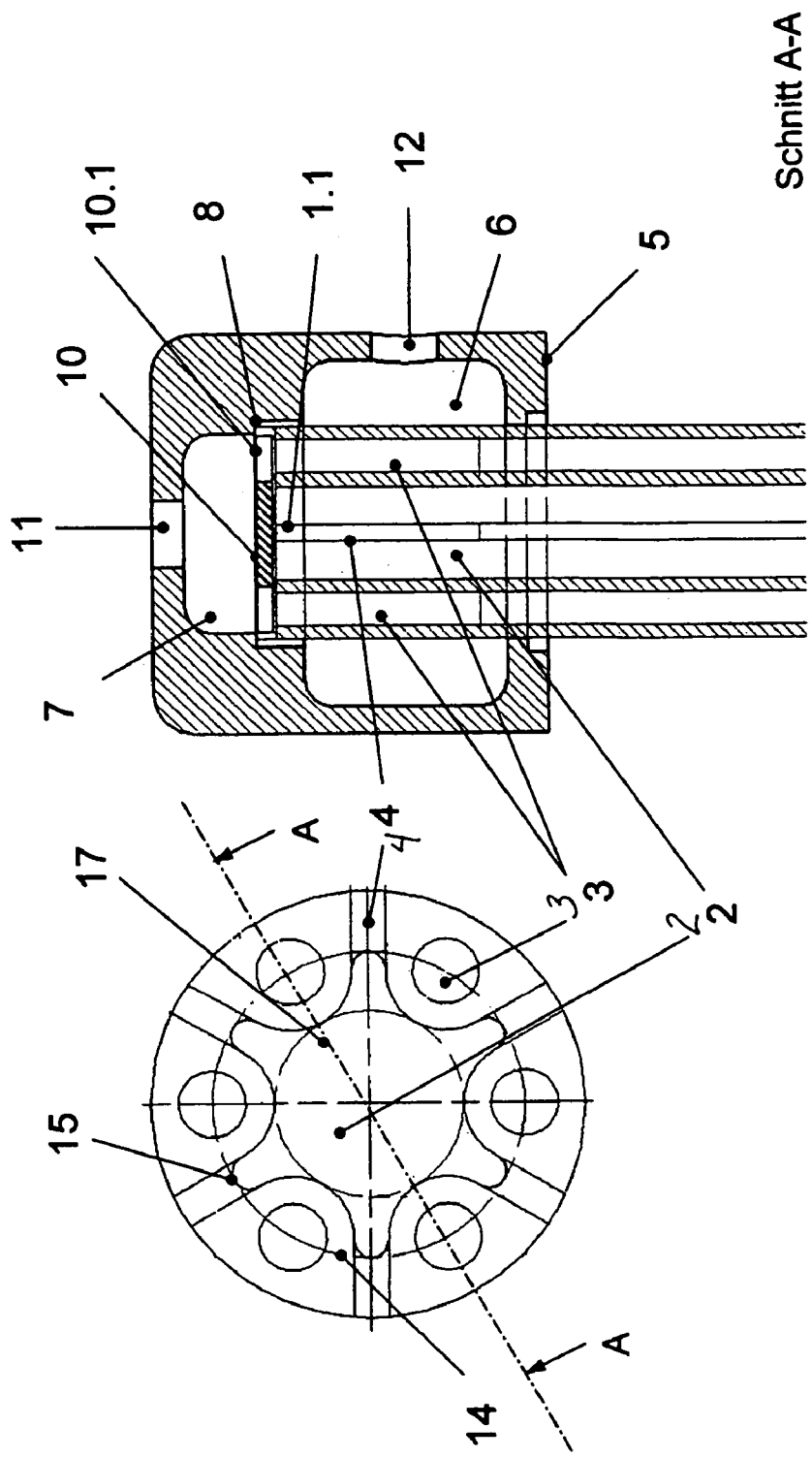

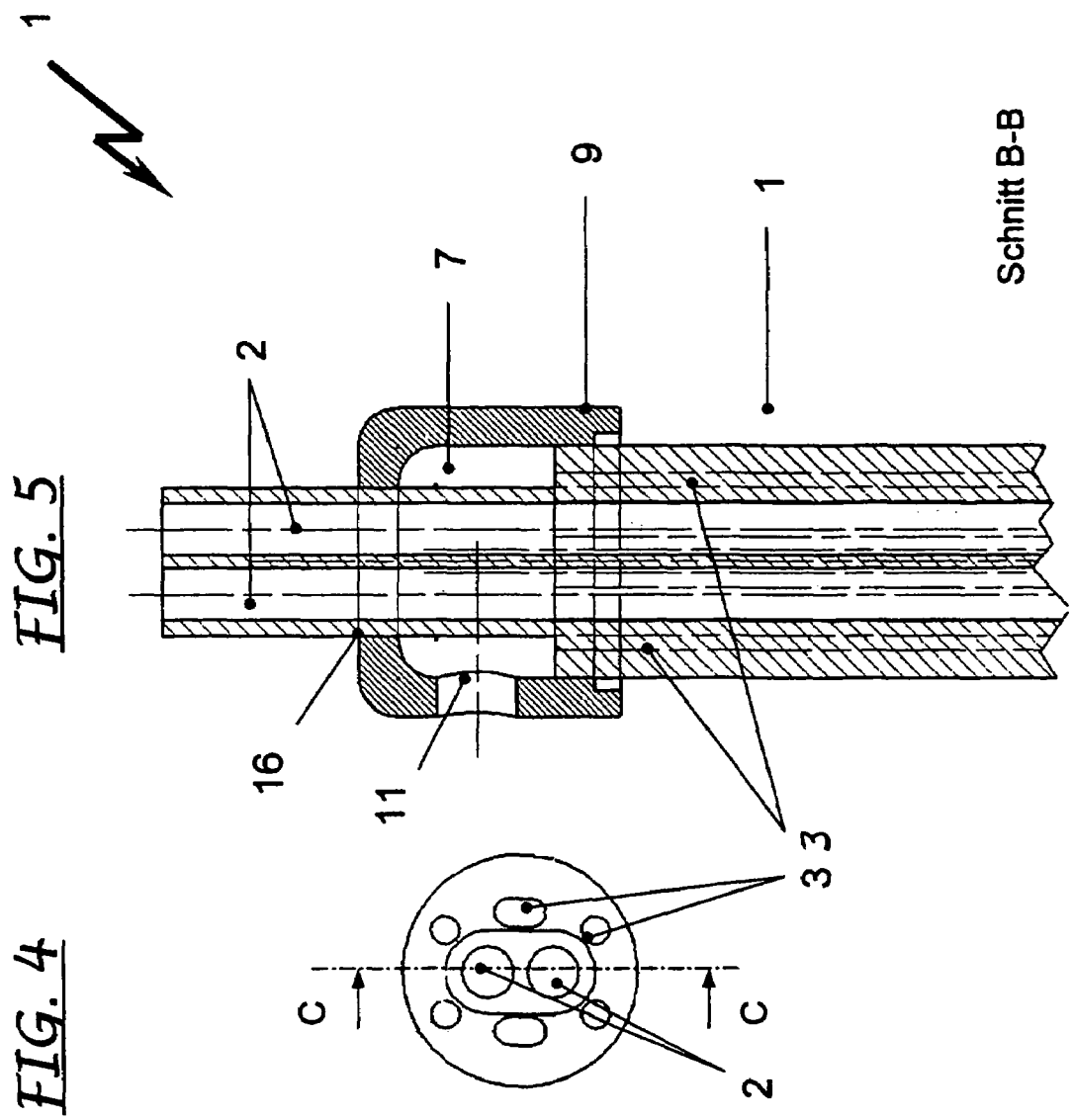

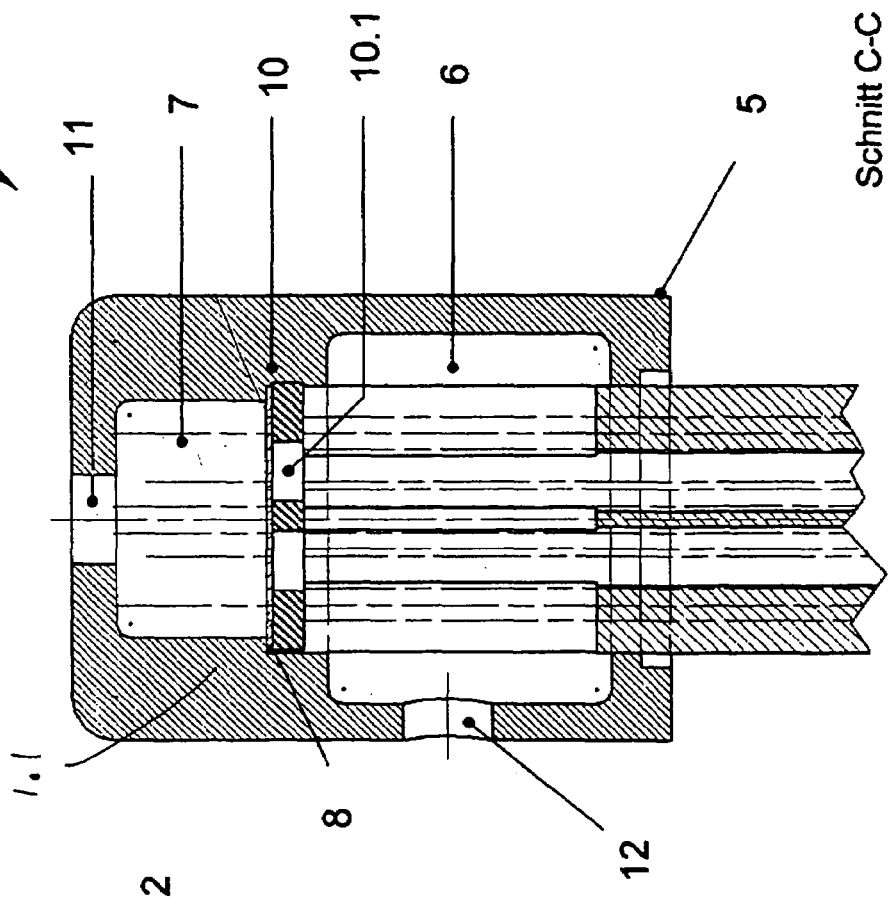
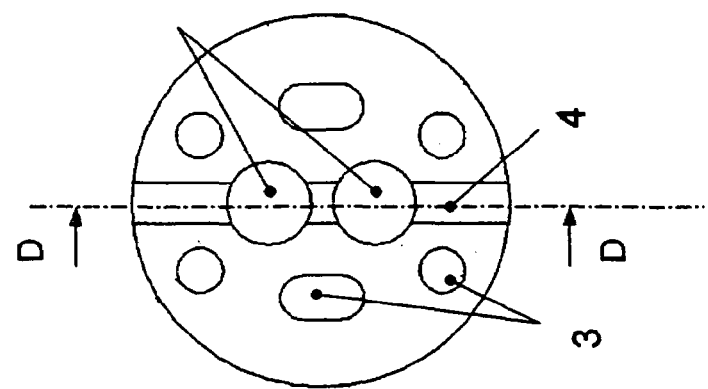

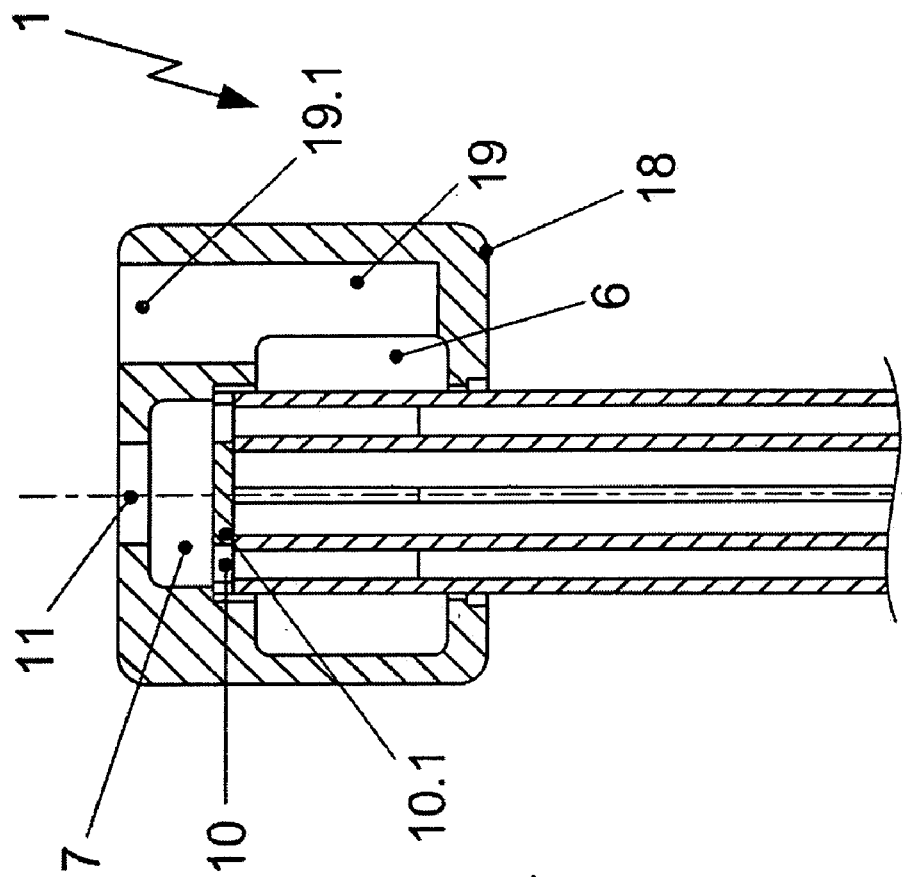
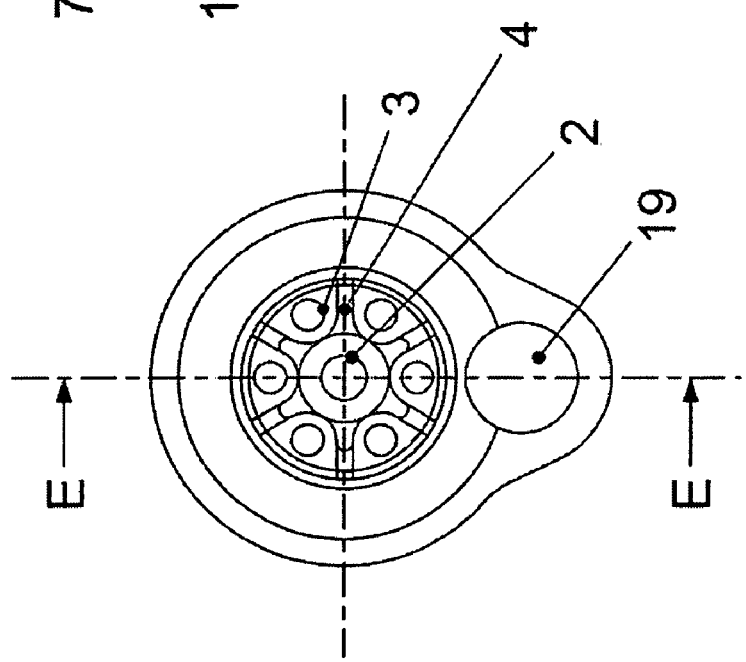
*FIG. 9*
*FIG. 8*

MULTI-CHANNEL HEAT EXCHANGER AND CONNECTION UNIT

BACKGROUND OF THE INVENTION

1. Field of Invention

The invention relates to a multi-channel heat exchanger with high-pressure channels and low-pressure channels and a connection unit for the connection of the multi-channel heat exchanger to other components, for example, an air conditioning unit or heat pump.

2. Related Technology

Below, a heat exchanger is called a multi-channel heat exchanger when the heat-transferring fluids flow through it in two or more in separate channels. The channels are arranged inside of and in the direction of the longitudinal extension or length of the cylindrical multi-channel heat exchanger. The heat exchanger is manufactured preferably by extrusion and used, for example, as an inner heat exchanger with a suitable connection unit within a refrigeration process.

Inner heat exchangers are used, for example, in vehicle air conditioning units, in order to enhance the efficiency of the refrigeration process. The principle of the inner heat exchanger is to transfer heat from the refrigerant with the higher pressure to the refrigerant with the lower pressure. The involved reduction or increase, respectively, of the enthalpy allows the system to achieve a higher refrigeration capacity.

Because of the limited space in a motor vehicle it is desired to also design the components of the vehicle's air conditioning unit, including the inner heat exchanger, such that they need the smallest possible space. That implies also that the surfaces available for heat transfer have to be optimized relative to the size of the inner heat exchanger.

If $CO_2$ is used as the refrigerant, the cross-sections of the refrigerant lines and channels in the heat exchanger must be small because of the high pressure of the refrigerant. Therefore it is necessary, depending on the structural design of the inner heat exchanger and particularly of the radial cross-sections, to provide suitable connection units that can be used to very easily connect, for example, tube lines to the high-pressure channels and to the low-pressure channels.

U.S. Pat. No. 6,098,704 discloses a space optimized coaxial heat exchanger for the heating of the air of a vehicle's interior, where a finned inner tube is inserted in a finned outer tube and whereby the outer wall of the inner tube positively and non-positively adjoins the radial fins of the outer tube. The fluids used for the heat transfer (a water-glycol mixture and a refrigerant) flow in the inner tube and in the interspaces between the fins of the outer tube. Due to this coaxial arrangement of the tubes, a plurality of small radial channels are created that result in good heat transfer. To separate the fluid flows a tube connector, provided over the entire perimeter of the inner tube, is used thus axially limiting the outer tube. Therefore, the refrigerant is able to flow from the outer tube into the tube connector, to be collected and to be further directed orthogonally to the longitudinal extension of the inner heat exchanger. The disadvantage of the heat exchanger is that due to the finned design of the inner and outer tubes, the heat exchanger cannot be operated with the high pressures occurring, for example, in air conditioning units using $CO_2$ as the refrigerant, for reasons of mechanical strength and safety.

From US 2002/0046830 A1, an inner heat exchanger is known that consists of one single tube and that has one inner channel and several outer channels. The outer channels are separated from each other by separating webs or fins, respectively, with the fins arranged radially to the main axis of the tube. The outer channels are connected to further tubes by a special connection element. For that connection, the connection element encloses the outer tube and therefore limits the axial ends of the outer channels. This connection element is connected to the heat exchanger through O-rings or by cutting ferrules guided in grooves. In addition, this connection element is provided with a hollow needle, through which the fluid flow from the axial channel is led out of the heat exchanger. This type of fixation and structural design of the connection element is very expensive.

Known from U.S. Pat. No. 4,368,777 is a cylindrical non-pressurized heat exchanger. The heat exchanger is a countercurrent unit in which water and a heating gas are passed in separate channels. The annular chamber of the outer channel leads the water and is dosed at its axial end by annular termination regions. The water is supplied through flanges that are located orthogonally to the longitudinal extension of the heat exchanger at the outsides of the outer chamber region. The inner tube leads the heating gas and, in its longitudinal extension, is provided with equally spaced radial fins at its inner and outer sides to improve heat transfer. The outer fins are located in the imaginary prolonged gap between two inner fins. In the flow directions of the water and the heating gas, the outer and inner fins, respectively are linearly enlarged in order to prevent the heat exchanger from being overheated or destroyed during operation. Finned heat exchanger tubes enable good heat transfer in some applications, but are not suitable for the inner heat transfer of a refrigeration process because of the high operational pressures and the resulting channel diameters. Additionally, manufacture of tubes finned at the inner and outer sides, with fins that linearly increase or decrease, respectively, in flow direction, appears to be very complicated and expensive.

What is needed by the manufacturers of vehicle air conditioning units, especially in connection with the use of refrigerants under high pressures such as $CO_2$, is to be able to design high-pressure-resistant heat exchangers with a connection element that are suitable for different geometries of the multi-channel heat exchangers and, furthermore, that can easily be connected to each other.

BRIEF SUMMARY OF THE INVENTION

Based on this state of the art, the invention meets these needs by providing a heat exchanger and a connection unit that are suitable for the high pressures in refrigeration processes, particularly for $CO_2$-operated vehicle air conditioning units, and that can easily be manufactured. Additionally, the invention has small mounting dimensions and is suitable for geometrically complicated multi-channel heat exchangers.

According to the invention, the problem is solved by a multi-channel heat exchanger with connection unit.

The connection unit, preferably arranged at the end of the multi-channel heat exchanger, creates axial and radial reservoirs in which the high-pressure and low-pressure fluids are collected and directed to the connection lines through connections at the respective reservoirs.

The low-pressure fluid flows into a radial reservoir, while the high-pressure fluid flows into an axial reservoir. The axial end of the multi-channel heat exchanger is limited by a termination element that has axial passages for the high-pressure fluid into flow to the high-pressure reservoir. The geometry of these passages is identical to that of the high-pressure channels, with the passages arranged concentrically in the termination element.

The low-pressure fluid flows through slots from the low-pressure channel to the low-pressure reservoir. These slots are only provided in the range of the low-pressure reservoir and are arranged radially. The slots are preferably made by sawing cuts, which compared to the prior art milling of the slots results in a lower-cost production of the multi-channel heat exchanger. Beginning from the axial end of the multi-channel heat exchanger these slots are made across the diameter and preferably symmetrical over the cross-section. The advantage of a sawing to milling is that the effort to manufacture a multi-channel heat exchanger can be significantly reduced.

The connection unit is attached to the multi-channel heat exchanger preferably by brazing. Alignment and penetration depth of the multi-channel heat exchanger and the termination element can be limited by means of a stop. The stop can be provided in the connection unit itself or on the outside of the multi-channel heat exchanger.

The multi-channel heat exchanger is preferably designed as a circular cylinder and has at least one low-pressure channel and a plurality of circular, elliptical or wedge-shaped channels concentrically arranged over a periphery, in which the high-pressure refrigerant flows. The low-pressure channel is essentially shaped as a circular cylinder and has radial protrusions, in longitudinal direction of the heat exchanger, that function to enlarge the heat transfer surface. These protrusions are preferably provided between two high-pressure channels arranged concentrically about the low pressure channel.

The connections provided at the high-pressure and low-pressure reservoirs each function to connect connection lines. They are effectively designed as sleeves or sockets.

According to another preferred embodiment of the invention, the connection unit has only one axially arranged high-pressure reservoir in which the flow direction directly follows the axial end of the high-pressure channels. The low-pressure refrigerant flows in at least one tubular channel that is routed through the high-pressure reservoir and an axial passage hole in the connection unit. The high-pressure reservoir, in this instance, is connected through an opening in the side wall of the reservoir.

For selected applications of the multi-channel heat exchanger and connection unit, two low-pressure channels are provided on the diameter of the cylindrical multi-channel heat exchanger and, in the region of the connection unit, connected through a longitudinal slot along the diameter with each other and with the low-pressure reservoir.

Another advantageous embodiment of the connection unit of the invention consists of an axial and radial reservoir, whereby the radial reservoir, instead of a socket, has a concentric and therefore cylindrical chamber arranged parallel to the axial reservoir. The advantage is that the low-pressure flow and the high-pressure flow can be led separately, but nevertheless jointly, in the axial direction, and the limited mounting space available can be utilized effectively.

In order to avoid thermal stresses the multi-channel heat exchanger, the connection unit and the termination element are made of the same material, preferably aluminum. Aluminum is especially suited to transfer heat due to its high heat conduction coefficient.

One skilled in the art will readily recognize from such discussion that the axial end of the multi-channel heat exchanger does not exclusively refer to one end, but the design according to the invention includes both axial ends.

The significant advantages of the invention are:
suitable for high operation pressures in refrigeration processes,
simple and cost-efficient manufacture,
mounting space-optimized connection units,
connection units are suitable for geometrically complex multi-channel heat exchangers.

BRIEF DESCRIPTION OF THE DRAWINGS

Below, the invention is exemplarily described by the accompanying drawings of which show:
FIG. 2: radial cross-section of a coaxial heat exchanger according to a preferred embodiment;
FIG. 3: axial cross-section of the tube connection element of the heat exchanger to FIG. 2;
FIG. 4: radial cross-section of a coaxial heat exchanger according to a second embodiment;
FIG. 5: axial cross-section of the tube connection element of the heat exchanger to FIG. 4;
FIG. 6; radial cross-section of a coaxial heat exchanger according to a third embodiment;
FIG. 7: axial cross-section of the tube connection element of the heat exchanger to FIG. 6;
FIG. 8: radial cross-section of a coaxial heat exchanger according to a fourth embodiment;
FIG. 9: axial cross-section of the tube connection element of the heat exchanger to FIG. 8.

DETAILED DESCRIPTION OF THE INVENTION

Figure 1:
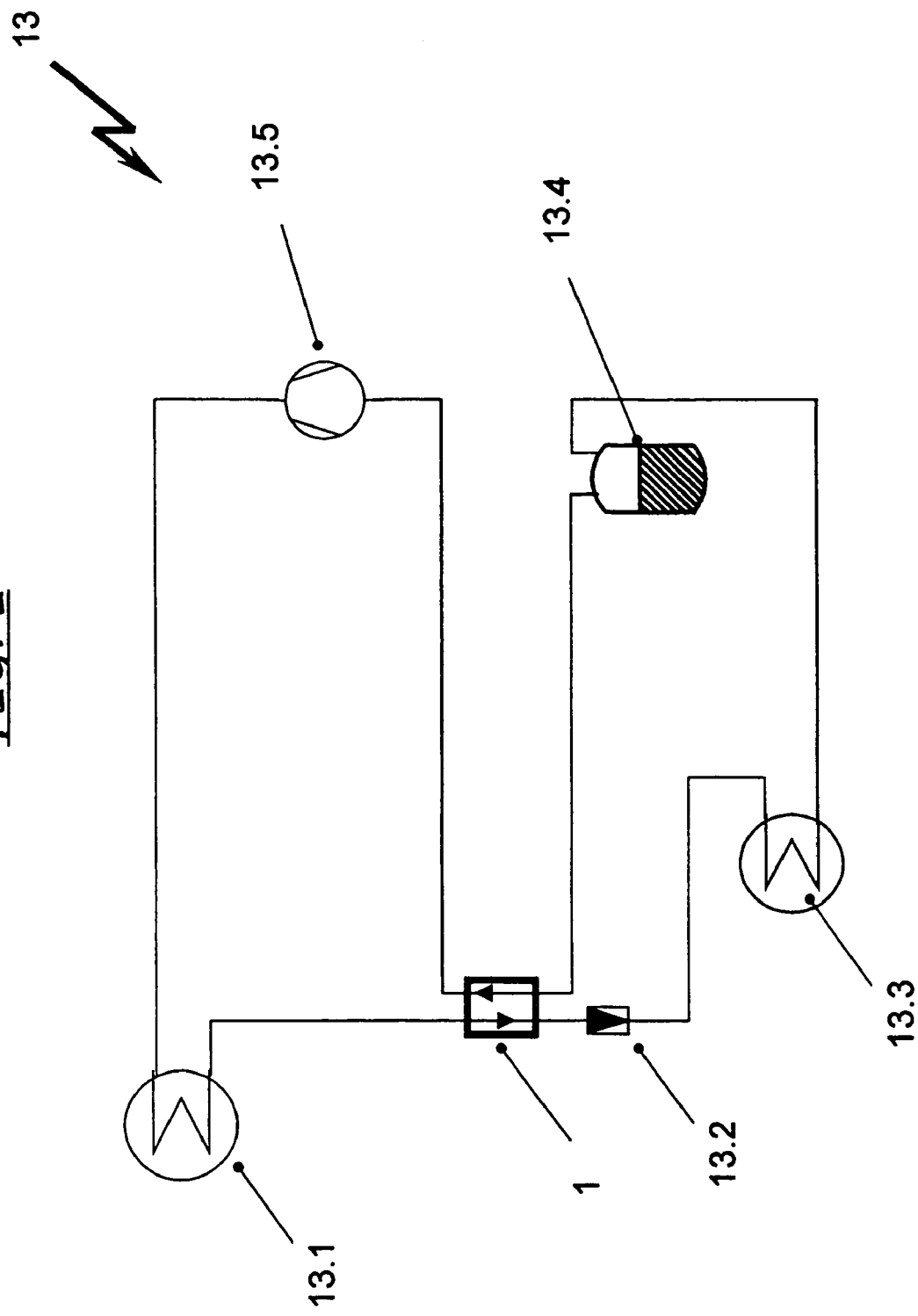
FIG. 1: refrigeration circuit of a vehicle air conditioning unit.

FIG. 1 shows the refrigeration circuit of a typical vehicle air conditioning unit 13. The low pressure region of the refrigeration process extends from the outlet of the expansion valve 13.2 to the suction side of the compressor 13.5 and the high-pressure region extends from the outlet of the compressor 13.5 to the inlet of the expansion valve 13.2. The inner multi-channel heat exchanger 1 is therefore simultaneously passed by high-pressure refrigerant and low-pressure refrigerant.

In the evaporator 13.3 the refrigerant expands and its enthalpy is increased. In flow direction between the evaporator 13.3 and the inner multi-channel heat exchanger 1, a refrigerant collector 13.4 with drier is arranged in order to collect humidity from the refrigerant and to dry the refrigerant. In the inner multi-channel heat exchanger 1 arranged directly downstream, heat is transferred to the low-pressure refrigerant, which results in an increase of the enthalpy of that refrigerant. In the compressor 13.5 the refrigerant vapor is compressed. After compression the refrigerant having the compression final temperature is cooled in the condenser/gas cooler 13.1 and directed to the inner multi-channel heat exchanger 1 for continued cooling. With the subsequent expansion of the high-pressure refrigerant in the expansion valve 13.2 and its flow to the evaporator 13.3 the refrigerant circuit is closed.

The FIGS. 2 and 3 show the radial and axial sections of a first preferred embodiment of the invention. A connection unit 5 is arranged at the end of the multi-channel heat exchanger 1 and has an axially arranged high-pressure reservoir 7 and a radially arranged low-pressure reservoir 6. The axial end 1.1 of the multi-channel heat exchanger 1 is limited by a termination element 10, which has axial passage holes 10.1 for the high-pressure fluid. The termination element 10 contacts the stop 8, which limits the penetration depth of the multi-channel heat exchanger 1 into the connection unit 5. The axial passage holes 10.1 preferably have geometry identical to that of the high-pressure channels 3. Six high-pressure channels 3 concentrically arranged over a periphery and designed as circular cylinders are laid through the low-pressure reservoir 6 and empty into the axial passage holes 10.1 of the termination element 10. The low-pressure channel 2 has six radial protrusions 15 that run in the longitudinal direction of the multi-channel heat exchanger 1. At the axial end 1.1 of the multi-channel heat exchanger 1, the protrusions 15 are radially shaped, in direction of the circumferential surface of the multi-channel heat exchanger 1, as six longitudinal slots 4. Each of these slots 4 is located between two adjacent high-pressure channels 3. In this way the low-pressure channel 2 is connected to the radially arranged low-pressure reservoir 6 so that, according to the invention, the low-pressure fluid flows through the slots 4 to the low-pressure reservoir 6 and is collected there. Over the connection 12 provided in the low-pressure reservoir 6 orthogonally to the longitudinally axis of the multi-channel heat exchanger 1 connection to other connection lines is provided. The high-pressure fluid leaves the connection unit 5 through the axial connection 11 in the wall of the high-pressure reservoir 7. A special advantage of this embodiment is that the sidewall of the reservoir 6 can be made with reduced thickness. Furthermore, the longitudinal slots 4 form a large outlet area relative to the cross-section of the low-pressure channel.

FIGS. 4 and 5 show a second preferred embodiment of the invention. Here the cylindrical connection unit 9 has only one axial high-pressure reservoir 7, in which the high-pressure refrigerant is collected. Referring to FIG. 5, the connection unit 9 and the multi-channel heat exchanger 1 have equal nominal sizes. This means that the inner diameter of the cylindrical connection unit 9 is equivalent to the outer diameter of the multi-channel heat exchanger 1. A special advantage of this embodiment is that the mounting width of the cylindrical connection unit 9 is small and the attachment of the cylindrical connection unit 9 to the multi-channel heat exchanger 1 can be realized with low effort, for example by brazing.

One skilled in the art will readily recognize that the low-pressure fluid flows in two separate, circular-cylindrical low-pressure channels 2. These low-pressure channels 2 are arranged on the diameter at equal distances from the circumferential surface each. In the area of the connection unit 9 both low-pressure channels 2 are made jointly as an elliptical tube. This tube 'accommodating' the two low-pressure channels 2 is laid through an axial passage hole 16 provided in the high-pressure reservoir 7. This axial passage hole 16 is adapted in its geometry to that of the elliptical tube so that in the contact range the connection unit 9 is positively connected to the multi-channel heat exchanger 1. Further, orthogonal to the longitudinal extension of the multi-channel heat exchanger 1, there is a connection 11 for connection lines in the wall. The high-pressure fluid flows in approximately six high-pressure channels 3 concentrically arranged. Referring to FIG. 4, these six high-pressure channels 3 are arranged symmetrically, whereby on either left and right side of the sectional axis two high-pressure channels 3 are designed as circular cylinders and another high-pressure channel 3 is designed as an elliptical cylinder. These high-pressure channels 3 lead at their ends into the connection unit 9, in which the high-pressure refrigerant is collected. The depth of penetration of the multi-channel heat exchanger 1 into the connection unit 9 is only dependent on the design of the ends of the high-pressure channels 3. One skilled in the art will readily recognize that the connection unit 9 must enclose the ends of the high-pressure channels completely to ensure the defined functionality.

The third embodiment of the invention, illustrated in FIGS. 6 and 7, consists of a low-pressure reservoir 6 and a high-pressure reservoir 7. Both reservoirs are separated from each other by a termination element 10 arranged at the axial end 1.1 of the multi-channel heat exchanger. This termination element 10 is preferably designed circular and limited by a stop 8. Under operational conditions the high-pressure refrigerant flows through axial passage holes 10.1 so that it reaches the high-pressure reservoir 7. The low-pressure region, further, includes two circular low-pressure channels 2, which in the region of the connection unit 5 are longitudinally slotted 4 and thus radially open in direction of the low-pressure reservoir 6. The slot 4 extends over the entire diameter of the multi-channel heat exchanger 1 so that both low-pressure regions are connected with each other and with the low-pressure reservoir 6. The high-pressure region, further, is characterized by four circular and two elliptical concentric channels. These channels 3 are arranged almost symmetric, i.e. each two geometrically identical channels are arranged like mirror images. The inner diameter of the connection unit 5 is larger than the outer diameter of the multi-channel heat exchanger 1 in the region of the low-pressure reservoir 6 to ensure the required free space for the refrigerant flowing out or in, respectively. It is seen that the slots 4 extend over the entire axial length of the low-pressure reservoir 6.

The FIGS. 8 and 9 show a fourth embodiment of the invention, whereby a connection unit 18 has an axially arranged high-pressure reservoir 7 and a radially arranged low-pressure reservoir 6 with the low-pressure reservoir 6 connected to a chamber 19 designed circular-cylindrical parallel to the high-pressure reservoir 6 into the chamber 19 arranged concentric to the main axis of the multi-channel heat exchanger 1. The chamber outlet 19.1 has a connection 12 so that the high-pressure flow can be led off directly beside the low-pressure flow in axial direction. Between each adjacent concentrically arranged high-pressure channels 3 there are longitudinal slots 4, which connect the axial low-pressure channel 2 with the low-pressure reservoir. The axial end 1.1 of the multi-channel heat exchanger with termination element 10 has, dependent on the number and geometry of the high-pressure channels, axial passage holes 10.1 for the high-pressure flow. Thus the high-pressure fluid, according to the invention, flows into the high-pressure reservoir 7 and further downstream over the axial connection 11 to connection lines. The heat transfer surface of an axially arranged cylindrical low-pressure channel 2 is enlarged by radial protrusions 15. The depth of these protrusions 15 depends on the amount of the desired enlargement of the heat transfer surface and the mechanical strength conditions.

The number and design of the high-pressure channels is not limited to the above-descriptions, but can be variably designed in a plurality of combinations. It is the number of high-pressure channels that particularly depends on the refrigerant flow rate and the operation pressure levels occurring in the refrigeration circuit.

The invention claimed is:
1. A connection unit comprising:
   a multi-channel heat exchanger with high-pressure channels and at least one low-pressure channel;
   a connection element with an axially arranged high-pressure reservoir and a radially arranged low-pressure reservoir, a connection in each of the high-pressure and low-pressure reservoirs for a connection line;

an axial end of the multi-channel heat exchanger being limited by a termination element, the termination element having axial passage holes for high-pressure flow to the high-pressure reservoir, a stop limiting the depth of penetration of the multi-channel heat exchanger and the termination element into the connection element, at the axial end of the multi-channel heat exchanger in the region of the low-pressure reservoir longitudinal slots being provided through which the low-pressure flow radially flows from the low-pressure channel to the low-pressure reservoir.

2. The connection unit of claim 1 wherein the slots at the ends of the multi-channel heat exchanger are made by a sawing cut across the diameter of the multi-channel heat exchanger.

3. The connection unit of claim 1 wherein the connection in each of the reservoirs is a socket.

4. The connection unit of claim 1 wherein the high-pressure channels of the multi-channel heat exchanger are homogeneously distributed concentrically about a periphery and a low-pressure channel is axially arranged, which in the region of the connection element is connected by at least one longitudinal slot to the low-pressure reservoir.

5. The connection unit of claim 1 wherein two low-pressure channels are provided on the diameter of the multi-channel heat exchanger and, in the region of the connection unit, are connected to each other and to the low-pressure reservoir by a slot.

6. A connection unit comprising:
a multi-channel heat exchanger with high-pressure channels and at least one low-pressure channel;
a connection element with an axially arranged high-pressure reservoir and a radially arranged low-pressure reservoir, a connection in each of the high-pressure and low-pressure reservoirs for a connection line;
an axial end of the multi-channel heat exchanger being limited by a termination element, the termination element having axial passage holes for high-pressure flow to the high-pressure reservoir;
the high-pressure channels of the multi-channel heat exchanger are homogeneously distributed concentrically about a periphery and a low-pressure channel is axially arranged, at the axial end of the multi-channel heat exchanger in the region of the low-pressure reservoir longitudinal slots are provided through which the low-pressure flow radially flows from the low-pressure channel to the low-pressure reservoir the low-pressure channel in its cross-section being designed as a circle with radial protrusions to enlarge the heat transfer surface.

7. The connection unit of claim 6 wherein between adjacent high-pressure channels in each case a slot is provided.

8. A heat exchanger device comprising:
a multi-channel heat exchanger having high-pressure channels and at least one low-pressure channel extending axially therein, slots being defined in an end of said heat exchanger, said slots intersecting said at least one low-pressure channel and defining a radial flow path from said at least one low-pressure channel;
a termination element positioned at said end of said heat exchanger, said termination element having apertures defined therethrough and aligned with said high-pressure channels; and
a connection element into which said termination element and said heat exchanger are received, said connection element having portions defining a high-pressure reservoir axially positioned relative to said heat exchanger and in communication with said apertures of said termination element, said connection element also having portions defining a low-pressure reservoir radially positioned relative to said heat exchanger and in communication with said slots of said heat exchanger, said high-pressure reservoir including portions defining a high-pressure line connection port, said low-pressure reservoir including portions defining a low-pressure line connection port.

* * * * *